United States Patent [19]
Cohen

[11] Patent Number: 6,074,299
[45] Date of Patent: Jun. 13, 2000

[54] INTERNET BASED SEARCH CONTEST

[76] Inventor: Robert H. Cohen, 623 N. Crescent Heights Blvd., Los Angeles, Calif. 90048

[21] Appl. No.: 09/020,034

[22] Filed: Feb. 6, 1998

[51] Int. Cl.$^7$ ..................................................... A63F 9/22
[52] U.S. Cl. ................................................. 463/42; 413/9
[58] Field of Search ............................ 463/40–42, 9–11, 463/16; 434/322, 323, 332; 700/91–93; 705/14; 709/223, 224

[56] References Cited

U.S. PATENT DOCUMENTS

| | | | |
|---|---|---|---|
| 5,035,625 | 7/1991 | Munson et al. | 434/332 |
| 5,083,800 | 1/1992 | Lockton | 273/439 |
| 5,241,671 | 8/1993 | Reed et al. | 395/600 |
| 5,586,937 | 12/1996 | Menashe | 463/41 |
| 5,643,088 | 7/1997 | Vaughn et al. | 463/40 |
| 5,712,979 | 1/1998 | Graber et al. | 709/224 |

OTHER PUBLICATIONS

C. Perrone et al: WebQuest: Substantiating education in edutainment through interactive learning games, May 1, 1996, pp. 1307–1319, vol. 28, No. 11, Computer Networks and ISDN Systems.

D. Julien: Adventure Games as a Continuing Education Excerise, Library Software Review, Jan.–Feb. 1986, pp. 16–20, vol. 5, No. 1.

M.A. Hornberger: Alive and Clicking: Teaching Web Research Classes, 7–12 Jun. 1997, pp. 259–261, Washington, DC, Special Libr. Assoc.

Multi channel news v17 p26, Viewer's Choice Uses Web Site, Feb. 1996.

Kim Cleland, what's on the web and read all over?, Advertising agencey v. 66 p. 16, Jun. 1995.

*Primary Examiner*—Valencia Martin-Wallace
*Assistant Examiner*—John M Hotaling, II
*Attorney, Agent, or Firm*—Christie, Parker & Hale, LLP

[57] ABSTRACT

An Internet-based Web Search Contest. Participants are provided clues as to target Web sites. The target Web sites are maintained in an ordered list and participants sequentially locate the target Web sites and are provided clues as to the next target Web site in the list.

16 Claims, 6 Drawing Sheets

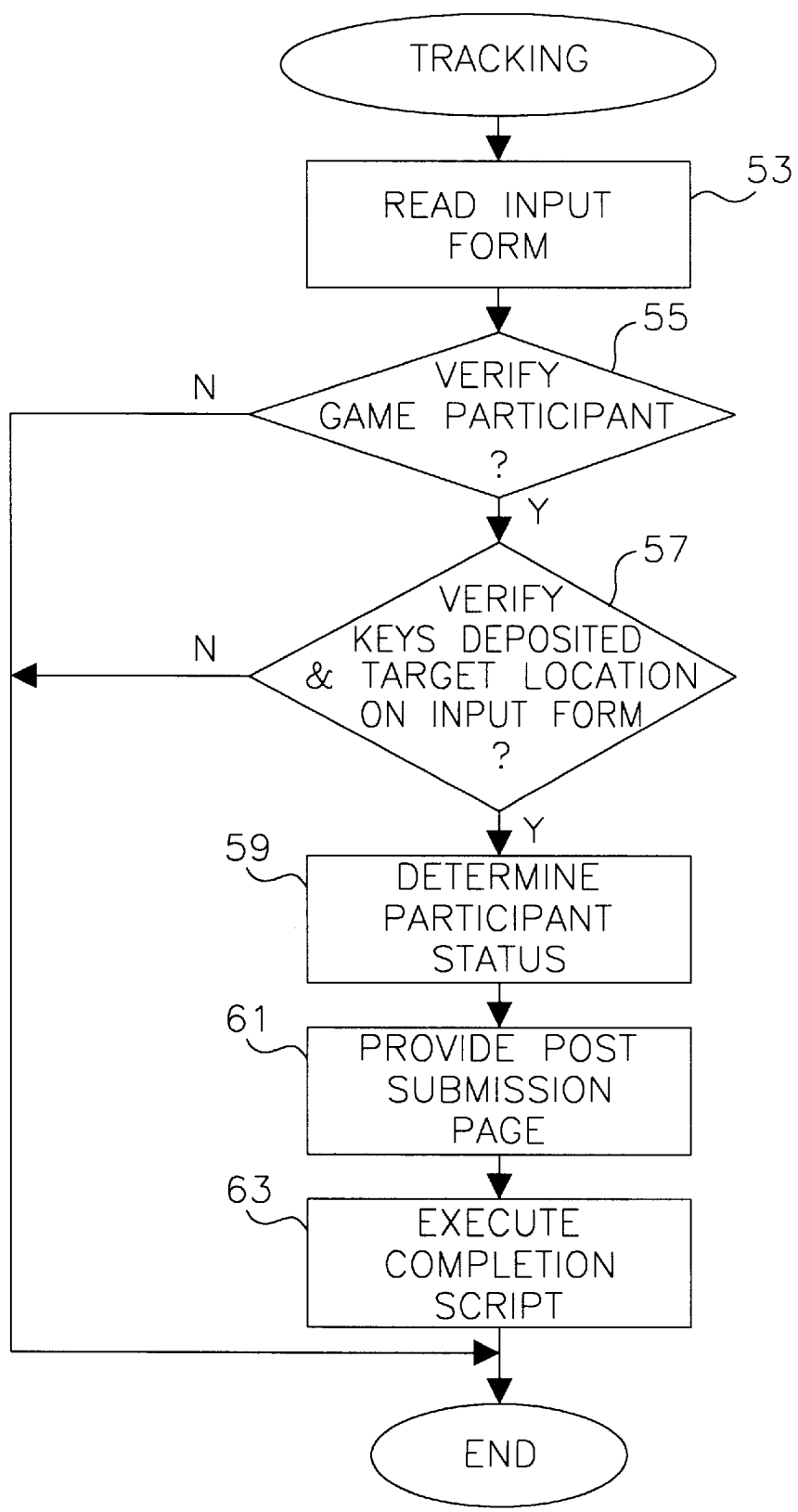

INTERNET BASED SEARCH CONTEST

BACKGROUND OF THE INVENTION

This invention relates generally to tracking user computer activity and more specifically to tracking user activity on the World Wide Web (Web) of the Internet.

The Web has blossomed as a means of access to a variety of information by a variety of remote individuals. The Web is an open system in that virtually any individual or organization with a computer connected to a telephone line may use the Web to present information concerning almost any subject. The Web has a body of software, a set of protocols, and a set of defined conventions for presenting and providing information over the Web. The Web uses hypertext and multimedia techniques to allow users to gain access to information available in the Web.

Users typically operate personal computers (PC's) executing browser software to access information stored by an information provider computer. The user's computer is commonly referred to as a client, and the information provider computer is commonly referred to as a Web server. The browser software executing on the user's computer requests information from Web servers using a defined protocol. One protocol by which the browser software specifies information for retrieval and display from a Web server is known as Hypertext Transfer Protocol (HTTP). HTTP is used by the Web server and the browser software executing on the user's computer to communicate over the Internet.

Web servers often operate using the UNIX operating system, or some variant of the UNIX operating system. Web servers transmit information requested by the browser software to the user's computer. The browser software displays this information on the user's computer display in the form of a Web page. The Web page may display a variety of text and graphic materials, and may include links that provide for the display of additional Web pages. A group of Web pages provided by a common entity, and generally through a common Web server, form a Web site.

A specific location of information on the Internet is designated by a Uniform Resource Locator (URL). A URL is a string expression representing a location identifier on the Internet or on a local Transmission Control Protocol/Internet Protocol (TCP/IP) computer system. The location identifier generally specifies the location of a server on the Internet, the directory on the server where specific files containing information are found, and the names of the specific files containing information. Certain default rules apply so that the specific file names, and even the directory containing the specific files, need not be specified. Thus, if a user knows that specific information desired by the user is located at a location pointed to by a URL, the user may enter the URL on the user's computer in conjunction with execution of the browser software to obtain the desired information from a particular Web server. Users, or the browser software executing on the user's computer, must always at a minimum know the Internet address portion of the URL for a particular Web server.

Often, the user does not know the URL of a site containing desired information. Even if the user once knew the proper URL, the user may have forgotten, mistyped, or otherwise garbled a URL for a specific location, as URL's can often be lengthy strings with a variety of special characters. To allow increased ease in locating Web sites containing desired information, search engines identifying Web sites likely to contain the desired information are widely available. A search engine using a well constructed search may often very quickly allow a user to quickly and accurately locate Web sites with desired information. Due to the multiplicity of Web sites, and indeed due to the unstructured nature of the Web, a poorly constructed search may make locating a Web site with the desired information virtually impossible.

An inability of a user to quickly and easily locate a Web site poses difficulties with respect to some commercial uses of the Web. Commercial entities have found the Web a useful medium for the advertisement and sale of goods and services. A variety of commercial entities have created home pages for the commercial entity as a whole, and for particular products sold and marketed by the commercial entity. The effectiveness of advertising in such a way on the Web is dependent on users accessing a commercial entity's Web site and viewing the information located there. The user must undertake two critical actions for this to occur. The user must first access a commercial entity's Web site, and then the user must actually view the material displayed there. A user who desires to view a Web page advertising or selling a particular product, but who is a poor Web searcher, may represent a lost sale of the product. Providing such a user training in Web search techniques may well benefit both the user and the commercial entity. Other users may purchase a product if presented compelling detail about the product, but have no express desire to visit a Web site advertising and selling the product. Providing a reason for such users to visit the Web site may be of great benefit to the commercial entity selling the product.

SUMMARY OF THE INVENTION

The present invention provides a method and system of evaluating Web search capability, tracking sequential progress of Web searches, and providing an enjoyable game for increasing Web search skills. The present invention also provides a method and system of increasing Web page advertising effectiveness.

An embodiment of the present invention provides a method and means of tracking Web search progress. The method includes providing information pertaining to an Internet location. Entry means are provided for identifying the Internet location. The time at which the clue was provided and the time at which the Internet location identifying information is entered are stored for review. Thus, a server computer provides a computer-readable clue relating to an Internet-based address to a user, and a server computer allows the user to enter information identifying the Internet-based addressed so that the server computer may provide the user feedback in determining whether the user successfully located the Internet based address. Thus, the present invention allows users to increase their Web search capabilities, to do so in a measurable way, including measurement against the skills and capabilities of other users and provides commercial entities a way of inducing users to access their Web sites. Many of the attendant features of this invention will be more readily appreciated as this game becomes better understood by references to the following detailed description considered in connection with the accompanying drawings.

DESCRIPTION OF THE DRAWINGS

FIG. 6 is a flow diagram of the process of a clue and tracking resource using the system of FIG. 1.

DETAILED DESCRIPTION OF THE INVENTION

Figure 1:
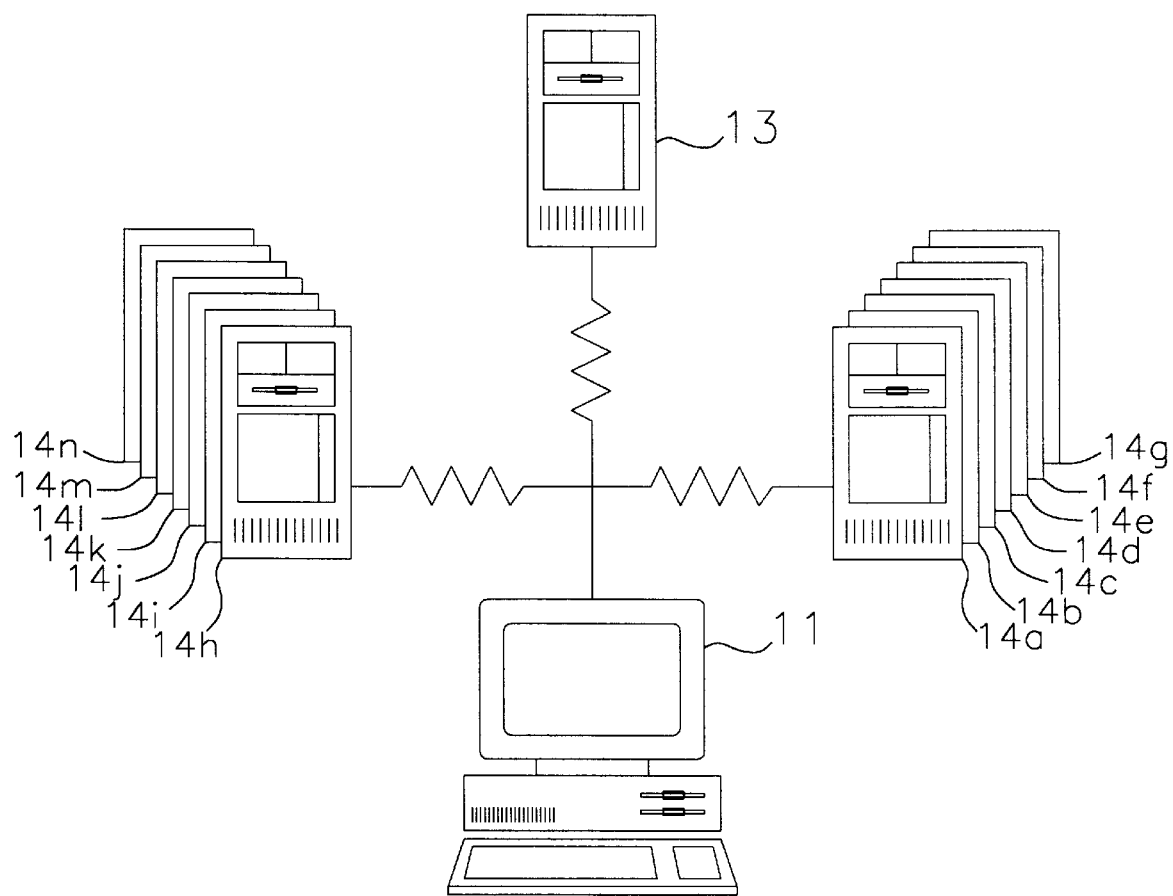
FIG. 1 is a block diagram of an internet system embodying the present invention.

An embodiment of the present invention provides an Internet-based search contest or game. Game participants are provided clues pertaining to Web sites or a particular Web page of a Web site by a game server. Each clue allows the game participant to locate a target, or check point, Web site or Web page. The target Web site or Web page is a target location. When a game participant locates a target location, another clue pertaining to another target location is provided to the game participant. Target locations contain a special mark or logo displayed on the Web page of the target location. The special mark or logo indicates that the Web site or page is, in fact, a target location.

Game participants indicate that they have located target sites by submitting a form on a submission page. The submission page resides on the Web server of the target location. The information input by the game participant on the submission form is provided to the game server. The game server verifies the correctness of the information input by the game participant and provides the game participant a clue pertaining to another target location. As game participants correctly identify target locations, the game participants are optionally provided information and/or other details by the owners of the target locations. Game participants continue to sequentially receive clues and find target locations until all target locations have been found. Upon finding a final target location, a game participant is informed of the total time the game participant required to find all target locations, the number of game participants who were able to find all the target locations prior to the game participant doing so, and the number of game participants who are still attempting to find target locations.

Each contest is a quest to find and view all of the target locations. Each of the game participants start at a quest home page provided by the game server to pick up clues pertaining to a target site. The game participants then find the target locations, and request information (i.e. web page data) from the target locations to view information provided by the target locations. The game participants deposit keys, i.e., code words, through use of a submission page input form to verify that they have found and viewed a target location. Game participants receive clues as to a next target location when the correct keys are deposited. Generally speaking, the keys may be any information relating to the target location. In a preferred embodiment, however, the keys include a name of the target location, the primary or targeted product sold or advertised by the target location, and a numerical value, such as the price of the primary product, displayed at the target location.

Additional clues pertaining to a target location are also obtainable by a game participant. Some game participants may be completely unable to find a target location when provided only a single clue. Other game participants may determine that a target location will take an inordinate amount of time to find given only a single clue. Accordingly, after a predetermined time after first receiving a clue pertaining to a target location, game participants are able to request additional clues pertaining to the target location so as to be able to more quickly find the target location.

FIG. 1 illustrates a block diagram of the present invention in the context of the World Wide Web. A user computer 11 is linked, telephonically or via other communication methods, to a number of other computers on the Internet. These other computers include a game server 13 and a variety of other server computers 14a–n, forming Web sites. Although only a limited number of server computers forming Web sites are illustrated, the number of Web sites accessible over the Internet is very large.

The user computer may comprise a personal computer (PC), an engineering workstation, a large mainframe computer, or any other computer system capable of supporting Internet communication and display functions. Thus, the user computer may also be a low cost machine specially designed for Internet browsing. The user computer includes various application programs, including a Web browser. The Web browser retrieves information from Web servers for display on the user's computer display terminal. The Web browser obtains a copy of the requested material from the Web server when a user, via the user computer, requests information from a Web server. Web browsers generally use hypertext transfer protocol (HTTP) as a protocol for communicating over the Internet with Web servers. Standard TCP/IP is utilized as a protocol to communicate between the user computer and the Web sites, and generally according to the Simple Mail Transfer Protocol (SMTP), SMTP being a TCP/IP protocol that operates at layers 5–7 of the Open Systems Interconnection (OSI) model. Web browsers are widely commercially available, and include Internet Explorer, available from Microsoft Corporation and Navigator, available from Netscape, and others. Both Internet Explorer and Navigator are suitable web browsers for use in conjunction with the present invention, with Navigator Version 4.0 and Internet Explorer Version 4.0 being the preferred versions.

The game server 13 is a Web server providing administrative and other functions for the Internet-based search contest. In a preferred embodiment, the game server is a computer with an Intel Pentium 166 MHz microprocessor, computer memory storage devices comprising 64 megabytes of RAM and a 2 gigabyte SCSI II hard drive, and a PCI 100BaseT network interface card. The computer operates under the Red Hat Linux (version 4.2) operating system, and executes Apache Web Server software (version 1.2.5) available over the internet at http://www.apache.org. The game server provides for initiation, control, and termination of the Internet-based search contest.

Figure 2:
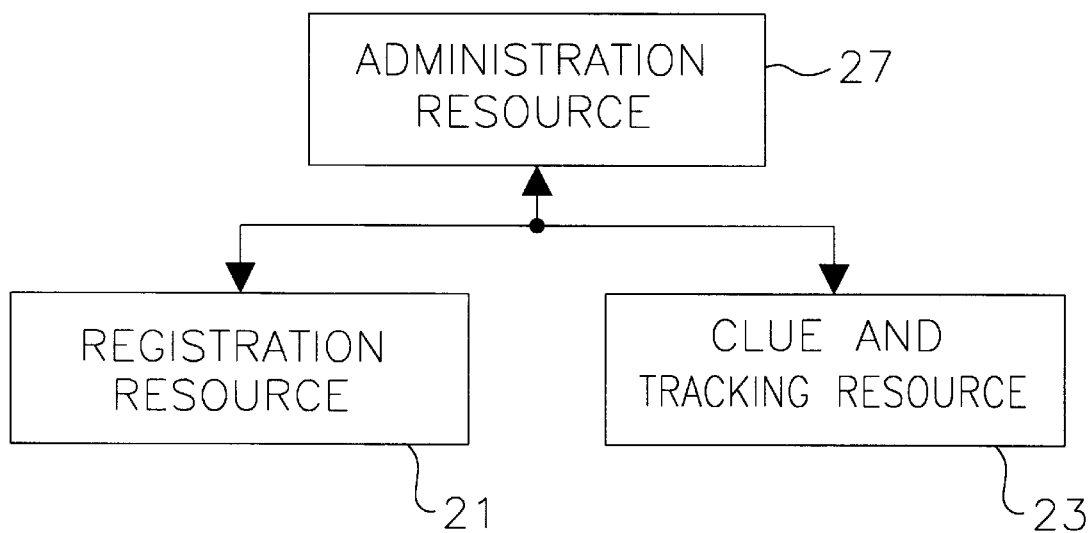
FIG. 2 is a block diagram of a server of the system of FIG. 1.

As shown in FIG. 2, the game server includes a registration resource 21 which allows users to inform the game server that they wish to be included in a particular game or quest. The game server also includes a clue and tracking resource 23 and an administration resource 27. The clue and tracking resource allows game participants to enter specific information relating to a particular target location. When the game participant enters appropriate information, the tracking resource updates the game participant's status and provides the game participant clues as to the next particular target location. The clues, or hints, pertain to particular target locations on the Web. Generally, the clue and tracking resource provides clues to users such that any particular game participant only has clues pertaining to one particular target location at any given time. The administration resource allows a Web server administrator to update or modify various game details. In the preferred embodiment, the registration resource, the clue and tracking resource, and other functions of the server comprise program modules or scripts in the PERL (Version 5.0) programming language.

PERL interpreters and the PERL programming language, and the uses thereof, are well known and often used by Web site developers.

The process of a user computer providing a URL to a server can be described as one of contacting a Web site and being provided a Web page. Some Web pages include forms which allow users to provide information to the Web server providing the form. This information is generally returned as part of a URL string, although other methods are also possible. The creation of forms and the reception of information from users by servers are well known methods to Web site developers.

Figure 3:
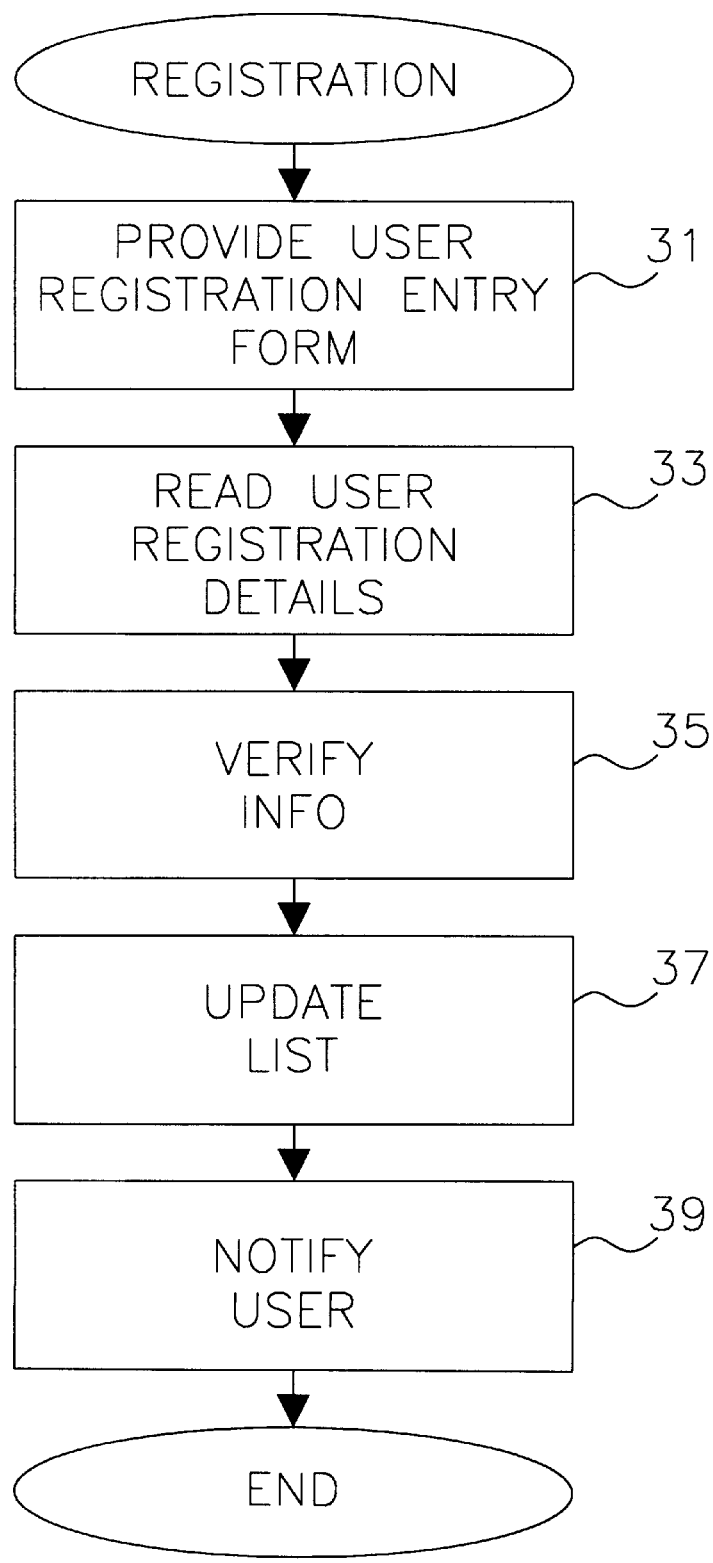
FIG. 3 is a flow diagram of the process of a user registration resource using the system of FIG. 1.
Figure 4:
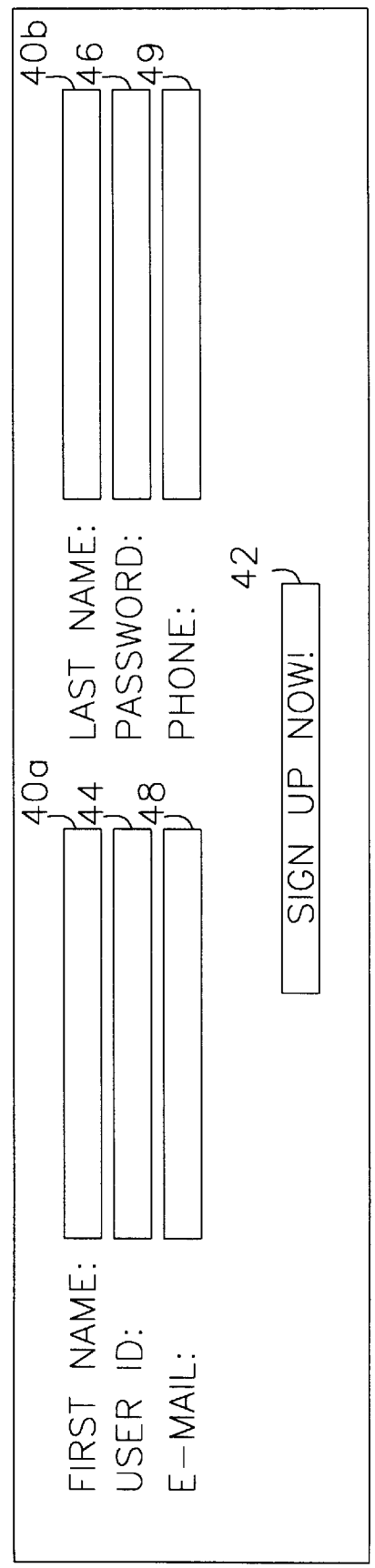
FIG. 4 is an illustration of a user registration form used in the process of the user registration resource at FIG. 3.

As shown in FIG. 3, when a user computer contacts the user registration site, the game server provides a page containing a user registration form in Step 31. The user registration form is illustrated in FIG. 4. The user registration form provides entry boxes for users to enter identification information. The entry boxes include a user First Name entry box 40a, a user Last Name entry box 40b, a user ID entry box 44, a user password entry box 46, a user E-mail address entry box 48, and a user phone number entry box 49. Users, using keyboards, computer mouses, and other computer input means, enter appropriate data in the user First and Last Name entry boxes and the user e-mail and phone number entry boxes. The user also enters a password in the password entry box for future user verification and identification purposes. The user ID is a number provided by the game server, and the user ID uniquely identifies each user. The user entry registration form also includes a sign up now button 42.

When the sign up now button is selected through use of the computer mouse or other computer input means, the Web browser software executing on the user's computer transmits the information entered in the entry boxes to the game server. The game server reads the information on the user registration form in Step 33. In Step 35 the game server verifies that all entry boxes of the user registration form have entries. In Step 37 the game server updates a game participant list with the information provided by the user. The game server stores the game participant list in the game server computer memory. In Step 39 the game server attempts to transmit an e-mail to the user to verify that the e-mail address provided by the user exists and to notify the user that the user has been successfully registered.

Figure 5:
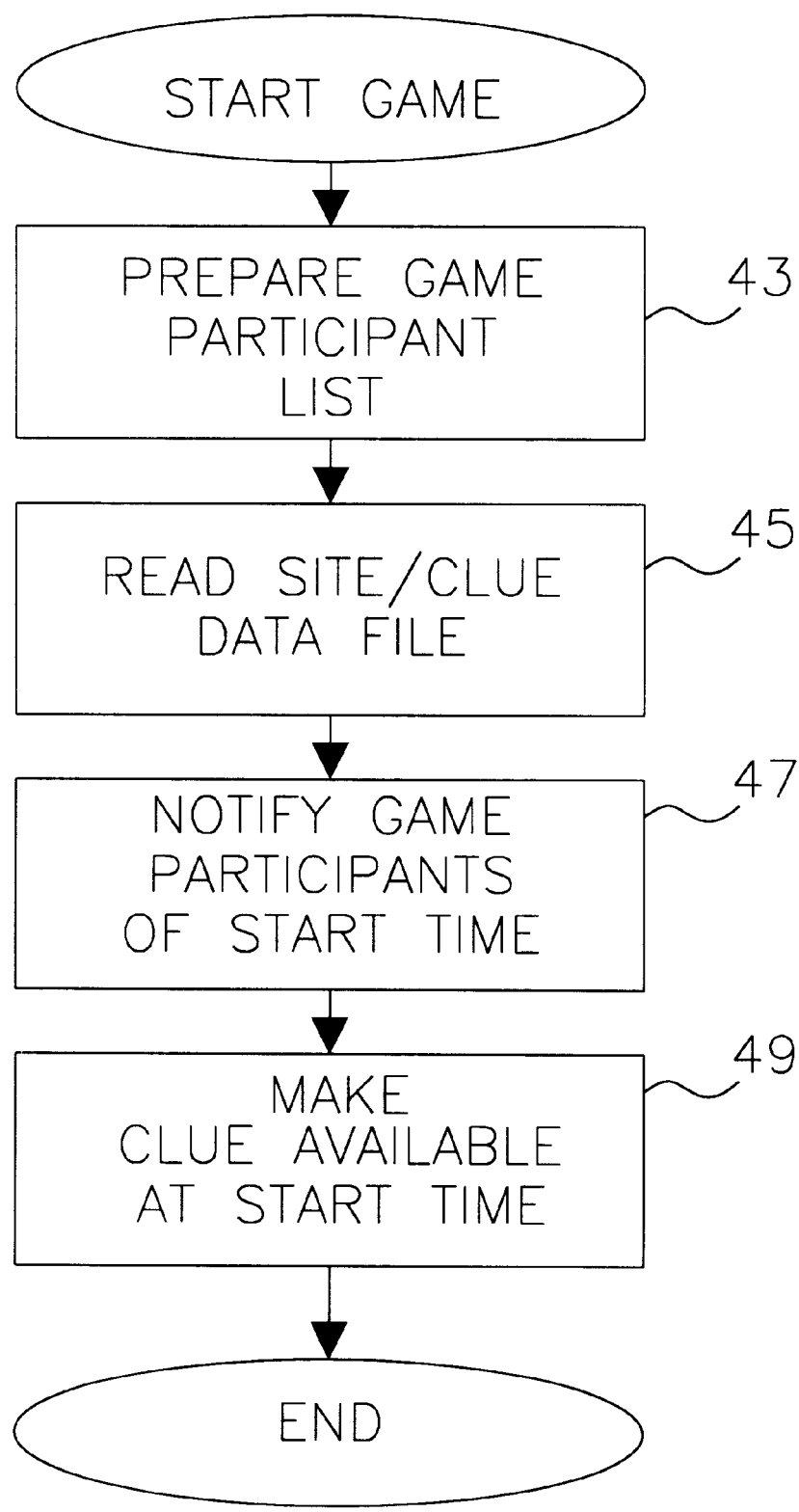
FIG. 5 is a flow diagram of the process of a start game resource using the system of FIG. 1.

A flow diagram of a start game process is illustrated in FIG. 5. The game server prepares a list of game participants for a particular game in Step 43. Optionally, game participants are registered users who have requested entry into a particular game. Otherwise, the list of game participants is the game participant list previously stored in the game server computer memory. The game server also reads a game data file containing information relating to the target locations for the game. The game data file includes information identifying the target locations and clue data, including a start point internet location, pertaining to those locations in Step 45. A sample data file is illustrated in Table 1.

TABLE 1

| Target Location | Clue | Start Point |
|---|---|---|
| http://a.com/sample1 | I'm a book written by a best selling author who has been known to play Hide and Seek with Jack and Jill and loves to watch movies and Kiss the Girls. But to know my title you'll have to remember what type of mammals Tom and Jerry were. | http://a.com |
| http://b.com/sample2 | I am a world renowned gammer who has been bested by no ONE. But a machine gave me the blues. My idols are Petrosian, Capablanca, and Tal. Technology sparred my predecessors Fisher and Spassky, from knowing the depths of the blues. | http://b.com |
| http://c.com/sample3 | To find my weight you'll need to look for the two most common things that a business sells. One you can touch, one you can't. Then continue to search with no strings attached. If you get this far, you'll find my three initials. You're almost there, but next you'll have to ask the question to your left. From here don't stop 'til you reach the end and you'll know my weight. | http://c.com |
| http://x.com/sample | I'm an estimation of how long your journey takes. But first you'll need charging ability times two. Leave your tickets at the door because you won't need them for this trip. With those two clicks your travels are finished. The answer is staring you in the face. | http://d.com |

The game server notifies each game participant of the starting time of the game by sending the game participant an e-mail in Step 47. The e-mail notifies the game participants of both the game start time and how the game participant may obtain the first clue for the first target location on or after the start time. At the game start time the game server makes the first clue for the first target location available to all game participants in Step 49.

A process of the game clue and tracking resource is illustrated in FIG. 6. The game clue and tracking resource reads a submission form in which the game participant has entered a user name, a password, and a key, which may also be called a code word, in step 53. The input form is provided to the game participant by the Web server of the target location. Preferably, the target location Web page includes a link to a Web page, maintained by the target location Web server, which includes the submission form. Although the target location Web server provides the submission form, the ACTION field of the submission form contains the internet address of the game server, thereby instructing the browser software operating on the game participant's computer to transmit the completed form to the game server.

In Step 55 the tracking process verifies that the user name and password entered on the submission form match that of a game participant by comparing the entered user name and password with those of the registered users. If the user name and password entered on the submission form do not match a user name and password on the list of game participants, the tracking process exits. If the input user name and password match that of a game participant, the tracking process determines if the game participant has entered the correct key or code word on the input form in Step 57. If the game participant did not enter the correct key or code word, the tracking resource exits. If the correct key or code word was entered, the tracking resource provides the game participant a post submission page in Step 61. The post submission page contains a clue pertaining to the next target location and a start point. The clue is descriptive text, graphical material, or audio information pertaining to the Web site that comprises the target location. In Step 63 the game server executes a form completion script. The form completion script causes the game server to store in the game server computer memory an indication that the game participant successfully found the target location. The form completion script also time stamps the indication that the game participant found the target location, and the time stamp is also stored in the computer memory of the game server.

Game termination occurs after a preset time from the game start time. The winner of the game is the game participant who has located the most target locations in the least amount of game time.

In an alternate embodiment, the user plays the game with the user's computer also simulating the game server. In this embodiment, the user is the sole game participant. The game data files, including target sites and the clues relating to the target sites, are stored on the user computer's memory, and this can be accomplished via the download of data from the Internet or through the use of removable storage media such as floppy disks. Versions of the tracking process and the clue provision process are similarly provided to the user computer's memory, and are executable by the user's computer. The clue and tracking process is modified to eliminate verification of a game participant as such verification is unnecessary when the game is limited to a single user's computer. In such an embodiment the user may leisurely use the game to improve the user's Web searching skills and to view a variety of Web sites without the pressure of competition.

Thus, the Internet-based search contest of the present invention provides a system and method of improving, tracking and monitoring Web searching skills. Additionally, the present invention provides a method and system of inducing users to visit and view a variety of Web sites. Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims rather than the foregoing description.

What is claimed is:

1. A method of tracking web search progress of a game participant using a game participant computer linked to the internet comprising:

providing information over the internet from a game server computer with a computer memory to the game participant computer at a first time, the information pertaining to an internet target location;

storing the first time in the computer memory;

examining submission information provided over the internet by the game participant computer to the game server computer at a second time; and storing the second time in the computer memory.

2. The method of tracking web search progress of claim 1 further comprising determining whether the submission information provided by the game participant computer correctly identifies the internet target location.

3. The method of tracking web search progress of claim 2 further comprising providing additional information over the internet from the game server computer to the game participant computer at first additional times, the additional information pertaining to additional internet target locations;

storing the first additional times in the computer memory;

examining additional submission information provided over the internet by the game participant computer to the game server computer at second additional times;

storing the second additional times in the computer memory.

4. The method of tracking web search progress of claim 3 further comprising multiple game participants each using a game participant computer, with each game participant uniquely identified by a unique identifier.

5. The method of tracking web search progress of claim 4 wherein the first additional times and the second additional times for each game participant are stored in the computer memory device in association with the unique identifier of each game participant.

6. The method of tracking web search progress of claim 5 further comprising sorting the additional internet target locations in a list having sequential positions and providing information over the internet from the game server computer to the game participant computer, the information pertaining to a one of the additional internet target locations appearing in the sequence of positions in the list to the game participant computer only when the additional submission information provided by the game participant computer correctly identifies the additional internet target location appearing immediately prior to the one of the additional internet locations in the sequence of positions in the list.

7. The method of tracking web search progress of claim 6 further comprising storing a status number indicative of the entries identifying additional internet locations for each game participant.

8. The method of tracking web search progress of claim 7 further comprising providing the status number and unique identifier of each game participant to all game participants.

9. A computer-implemented internet-based learning system in communication with a user computer connected to the internet comprising:

a server computer connected to the internet with clue provision means for providing information pertaining to a target web page to the user computer connected to the internet; and tracking means operated by the server computer for determining if the user computer has received information from the target web page.

10. A computer-based web search game comprising:

a user computer, with a computer memory and a display, connected to the internet;

at least one computer-readable clue stored in the computer memory and displayed by the computer display, the computer readable clue pertaining to a predetermined web page provided by a web server computer over the internet; and tracking means operated by the user computer for determining if the user computer has received the predetermined web page provided by the web server computer over the internet.

11. The computer-based web search game of claim 10 further comprising at least one code word associated with the predetermined web page.

12. The computer-based web search game of claim 11 wherein the tracking means comprises entry means for entering on the user computer a code word guess and comparison means operated by the user computer for comparing the code word guess with the code word.

13. A computer-based web search game comprising:
- a plurality of computer-readable clues, each one of the computer-readable clues being associated with one of a plurality of target web pages provided by at least one web server;
- a server computer, with a computer memory, connected to the internet and storing the plurality of sets of computer-readable clues in the computer memory, the server computer comprising:
  - clue provision means for providing one of the computer-readable clues to a user computer connected to the internet, the one of the computer-readable clues being associated with one of a plurality of target web pages;
  - tracking means for determining if the user computer has received the one of the plurality of target web pages from at least one web server.

14. The computer based web search game of claim 13 wherein the plurality of target web page are sequentially ordered in a list having a lowest position and a highest position.

15. The computer based web search game of claim 14 wherein the clue provision means provides computer-readable clues associated with a target web page with a first position in the list to a user computer only if the tracking means has determined that the user computer has received all of the target web pages having positions higher in the list than the first position.

16. The computer based web search game of claim 15 wherein the server computer further comprises timing means for timing the period beginning with the time at which the clue provision means first provides a clue associated with a target web page having the highest position in the list to a user computer and the time at which the tracking means determines the user computer has displayed a target web page having the lowest position in the list.

* * * * *